United States Patent [19]

Harrison et al.

[11] Patent Number: 4,947,579
[45] Date of Patent: Aug. 14, 1990

[54] COMPUTER OPERATED AUTOMATIC SEEDLING PLANT TRANSPLANTING MACHINE

[75] Inventors: Richard Harrison; Deborah Harrison, both of Calverton; Peter B. Zuhoski, Jr., Wading River, all of N.Y.

[73] Assignee: Weirton Steel Corporation, Weirton, W. Va.

[21] Appl. No.: 259,795

[22] Filed: Oct. 19, 1988

[51] Int. Cl.⁵ .................. A01C 00/00; A01G 00/00
[52] U.S. Cl. ....................... 47/1.01; 47/901; 111/105
[58] Field of Search ............. 47/1.01, 901; 111/104, 111/105

[56] References Cited

U.S. PATENT DOCUMENTS 3,012,370 12/1961 Lortz et al. .................. 47/901
3,460,277 8/1969 Grover et al. .
4,627,190 12/1986 Little ........................... 47/1.01

FOREIGN PATENT DOCUMENTS 1287488 10/1955 France .
2357448 3/1976 France .
2345371 10/1977 France .
WO8601975 4/1986 PCT Int'l Appl. .
308825 7/1976 Switzerland .
2009096A 6/1979 United Kingdom .

Primary Examiner—David A. Scherbel
Assistant Examiner—Michele Van Patten
Attorney, Agent, or Firm—Raymond N. Baker

[57] ABSTRACT

An automatic transplanter utilizes relatively simple mechanical structure to so securely engage the root-bound plug of a seedling that the plug and seedling may be rapidly (a) lifted out of its small germination compartment, (b) horizontally transported to correct vertical register with its newly assigned soil-filled and dibbled larger compartment, and (c) accurately positioned in and discharged into the dibbled cavity. An illustrative relatively short two-second cycle is described wherein plural seedlings are thus concurrently transplanted, for each such cycle, from individual small compartments on a first periodically advanced conveyor of a two-dimensional array of germinated seedlings to correct individual larger compartments on a second conveyor that is also periodically advanced, but at a recurrence rate and incremental advance which differ from that of the first conveyor. All operations, including those involved in a multiple-plant pick-up, transport, and discharge, as well as dibbling, conveyor-advance increments and timing, and even automatic tagging of individual transplanted pottings, are under suitably programmed PC-computer control, and provision is made for such flexibility in setting up the apparatus as to adapt the same to changes in the two-dimensional array configurations and compartment-size proportions which may be involved in the automated transplanting of different varieties of plant seedlings.

34 Claims, 9 Drawing Sheets

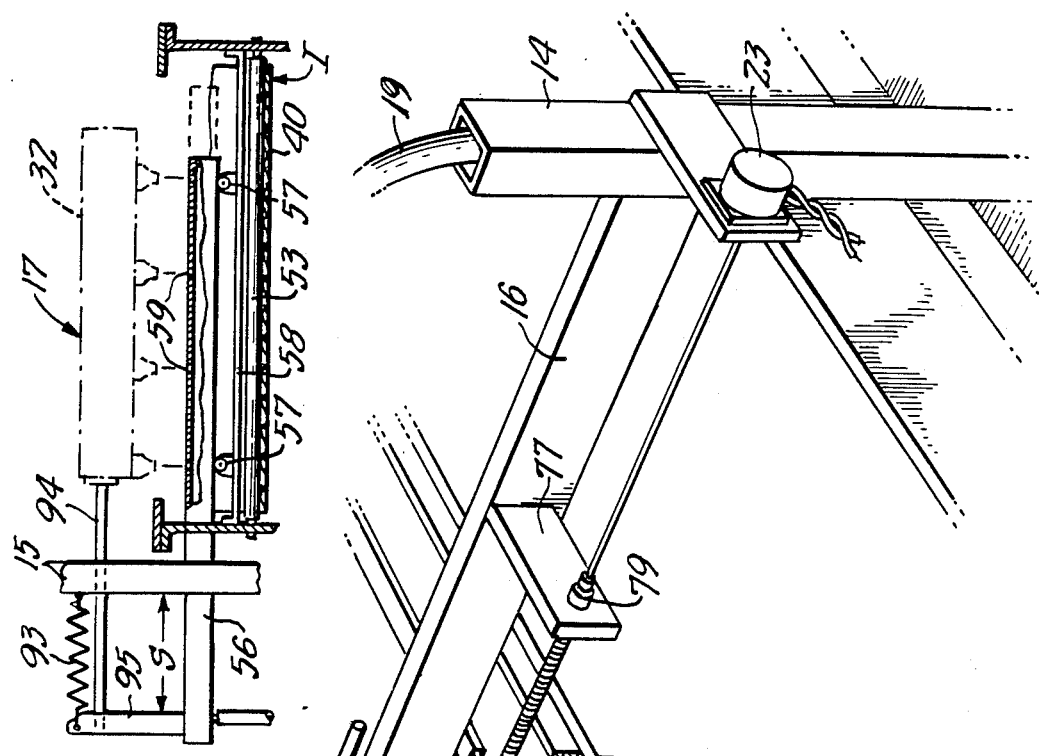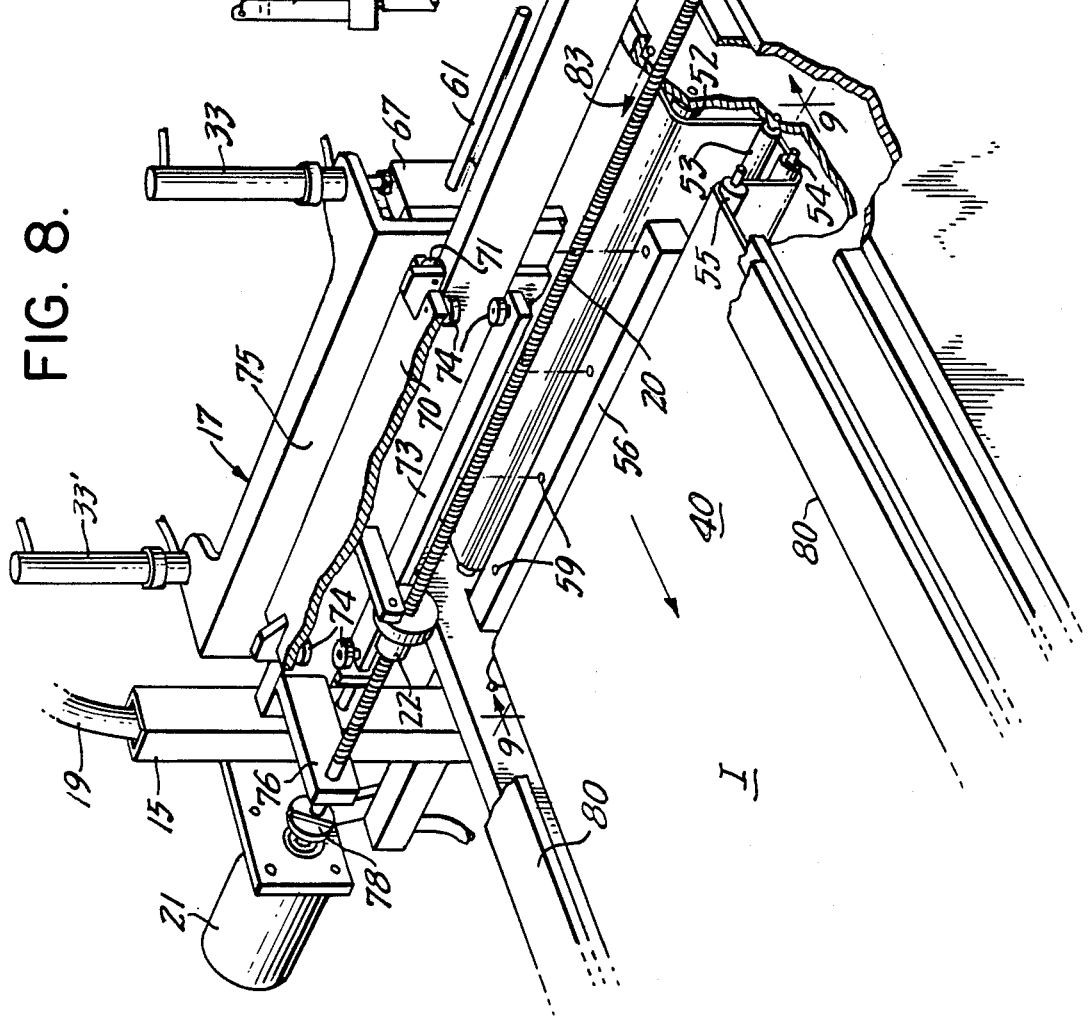

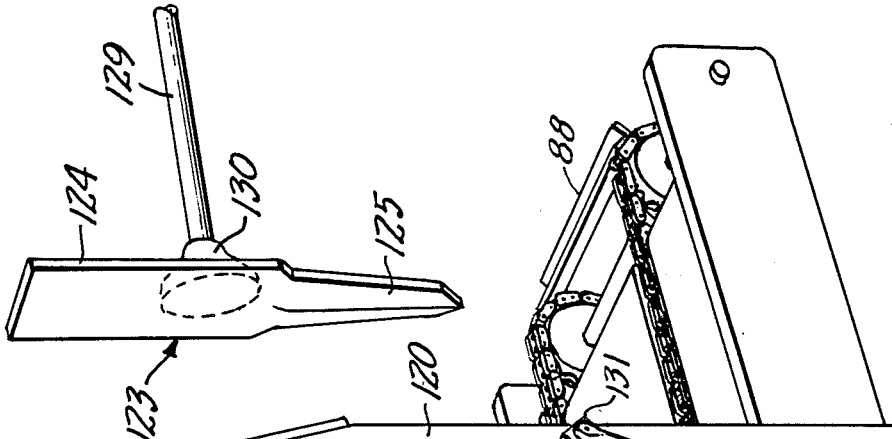
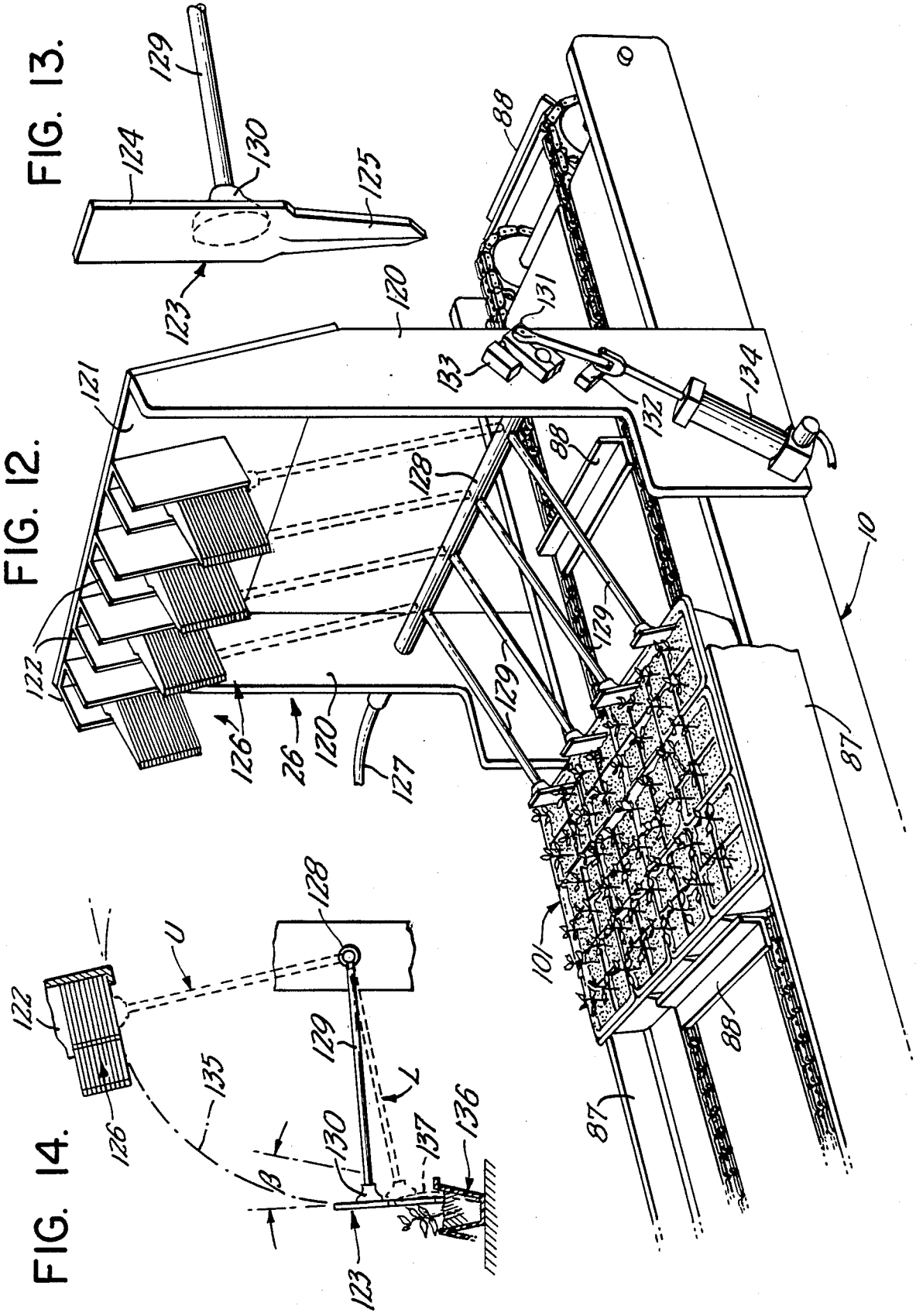

COMPUTER OPERATED AUTOMATIC SEEDLING PLANT TRANSPLANTING MACHINE

BACKGROUND OF THE INVENTION

The subject invention relates to a method and apparatus for automatically transplanting, under computer control, plant seedlings from trays having individual seedling compartments of a first size and/or array pattern, to trays having individual seedling compartments of another size and/or array pattern. The most common application of the method and apparatus of the present invention will probably be to transplant seedlings from trays with relatively small compartments in which they were placed at the plant-germination stage to trays with relatively larger compartments when the seedlings have reached an appropriate size for marketing.

Oki, et al. U.S. Pat. No. 2,826,003 discloses a machine for depositing and shaping soil in a relatively large tapered container, wherein the soil-shaping operation is such as to define a cavity which conforms to and is thus adapted to receive the tapered "ball" or root pack of a growing plant which to that point has been nurtured in a smaller container or pot. The patent describes automated progressive means for filling and shaping the soil in a production line of the relatively large containers.

Qvarnstrom U.S. Pat. No. 4,408,549 discloses a method and apparatus for mass growing of seedlings in a controlled atmosphere, for later transplanting into a permanent site, e.g., for reforestation. Seeds are germinated into seedlings in a growth medium arranged in trays having individual compartment recesses or pots, joined together to form a seedling unit. The patent addresses the problem of automatically scanning a seedling unit to identify those recesses wherein the seedlings are dead or the inserted seeds have not germinated. Those recess locations that have been thus identified are automatically emptied and are filled with a germinated seedling along with the required growth medium.

Turunen U.S. Pat. No. 4,307,827 discloses a method and device for feeding plant cells to a planting device in a planting machine. The plant cells are in the form of a cell sheet arranged as a plurality of interconnected narrow unified lines. The patent describes means to separate successive unified lines and to separate individual cells from the separated unified lines, all to provide an orderly flow of separated cells to the planting device.

Boucher U.S. Pat. No. 3,337,986 discloses an automatic plant pot-filling machine which includes automatic mechanical means for manipulating the pots, transporting the pots, filling the pots with earth, and placing grains, saplings, young seeds, or the like into the earth fill.

Lortz, et al. U.S. Pat. No. 3,012,370 discloses apparatus for potting plant seeds and seedlings, wherein the pots are of peat moss or analogous material. The pots are progressively advanced by conveyor mechanism to a succession of stations along the path of conveyor travel. At each station, a different operation is performed, contributing to completed assembly of individually potted and watered plant elements. When seedlings are to be thus potted, a soil-dibbling operation is performed at one of the stations, prior to seedling transplanation into the thus-prepared potted soil.

BRIEF STATEMENT OF THE INVENTION

It is an object of the invention to provide a method and means whereby seedlings grown in individual seedling compartments of a first size and/or array pattern are automatically transplanted, under computer control, into individual seedling compartments of a second size and/or array pattern.

A specific object is to meet the above object for the situation in which compartments of the first size are relatively small and contain germinated seedlings in a first two-dimensional array of compartments, and in which compartments of the second size are relatively large and are in a second two-dimensional array which is suitable for marketing.

Another specific object is to provide improved means for engaging, picking up, transporting, and discharging a seedling plant via its root-bound plug or ball without damage or impairment of the involved seedling.

A further specific object is to provide means whereby the foregoing objects are achieved in multiple for each cycle of seedling pickup, transport and discharge, so that in the course of a single cycle, plural seedling plants are concurrently transplanted, each from its own separate first-size compartment and into its own separate second-size compartment.

A general object is to achieve the above objects with such enhanced cyclical speed and efficiency as to effect a major reduction in labor expense, enabling a single unskilled operator to complete the filling of all transplant compartments with properly germinated seedlings.

Significant in the achievement of these objects is the provision of an improved and relatively simple means to so securely engage the root-bound plug of a seedling that the plug and seedling may be rapidly (a) lifted out of its small germination compartment, (b) horizontally transported to correct vertical register with its newly assigned soil-filled and dibbled larger compartment, and (c) accurately positioned in and discharged into the dibbled cavity. An illustrative relatively short two-second cycle will be described wherein plural seedlings are thus concurrently transplanted, for each such cycle, from individual small compartments on a first periodically advanced conveyor of a two-dimensional array of germinated seedlings, to correct individual larger compartments on a second conveyor that is also periodically advanced, but at a recurrence rate and incremental advance which differs from that of the first conveyor. All operations, including those involved in multiple-plant pick-up, transport and discharge, as well as dibbling, conveyor-advance increments and timing, and even automatic tagging of individual transplanted pottings, are under suitably programmed PC-computer control, and provision is made for such flexibility in setting up the apparatus as to adapt the same to changes in the two-dimensional array configurations and compartment-size proportions which may be involved in the automated transplanting of different varieties of plant seedlings.

DETAILED DESCRIPTION

The presently preferred embodiment of the invention will be described in detail for an illustrative application, in conjunction with the accompanying drawings, in which:

FIG. 6A is a fragmentary view in elevation of part of the carriage of FIG. 6 to show an adjusted second equally spaced relation of the plural picking heads;

FIG. 6B is a left-side view of the carriage of FIG. 6;

FIG. 8 is a view in perspective, from the operator's side and showing transport drive and control structure for the carriage of FIG. 6, the view being partly broken-away to reveal a conveyor detail;

FIG. 9 is a fragmentary view in elevation that is partly broken-away and in vertical section, generally in the plane designated 9—9 in FIG. 8;

FIG. 12 is a perspective view of transplant-tagging mechanism in the machine of FIGS. 1 to 3;

FIG. 13 is an enlarged fragmentary view in perspective of one tag and its holder forming a component of the mechanism of FIG. 12;

FIG. 14 is a simplified diagram in aid of discussing operation of tagging mechanism.

Figure 1:
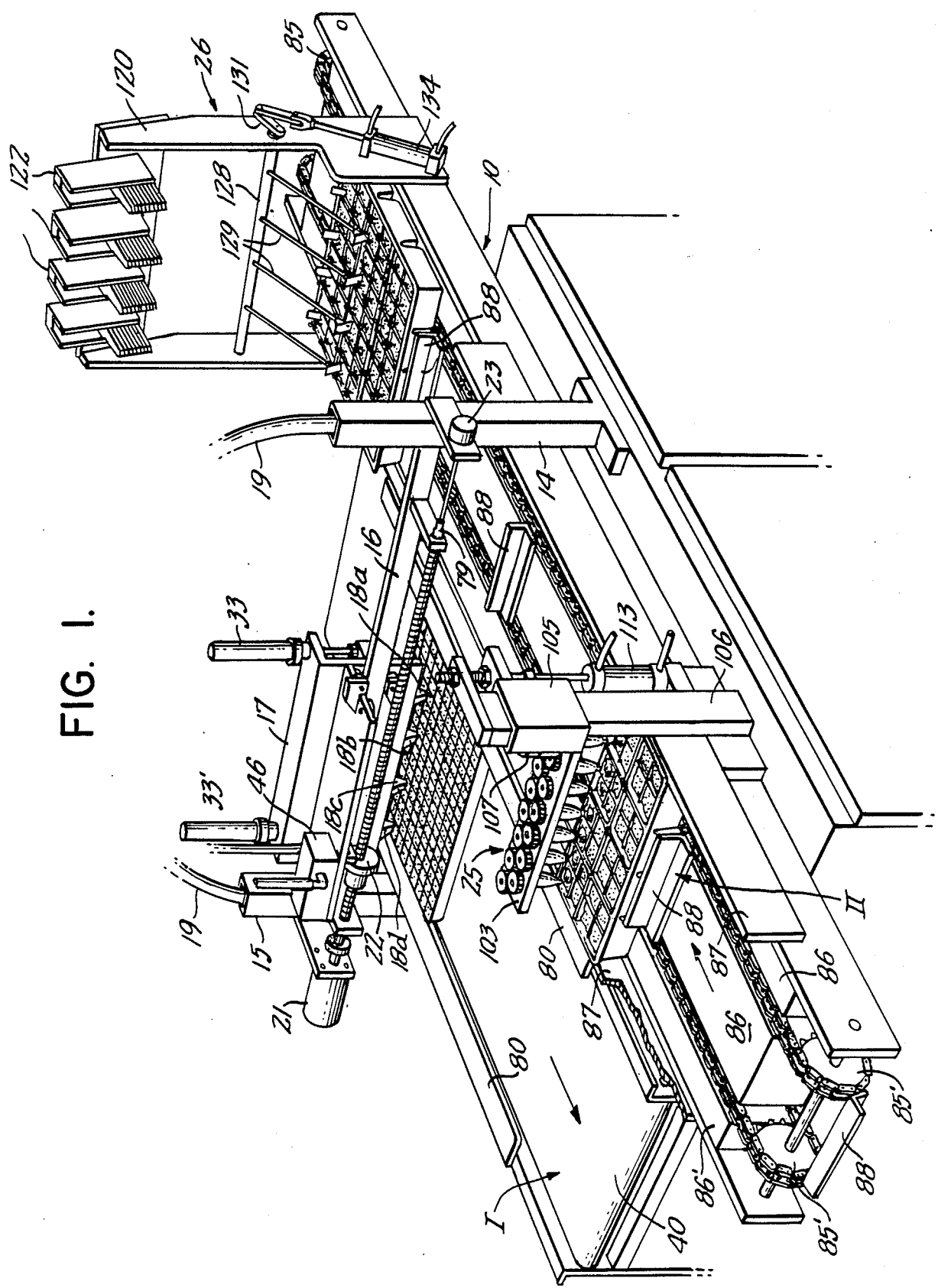
FIG. 1 is an overall view in perspective of an automatic transplanting machine of the invention.
Figure 2:
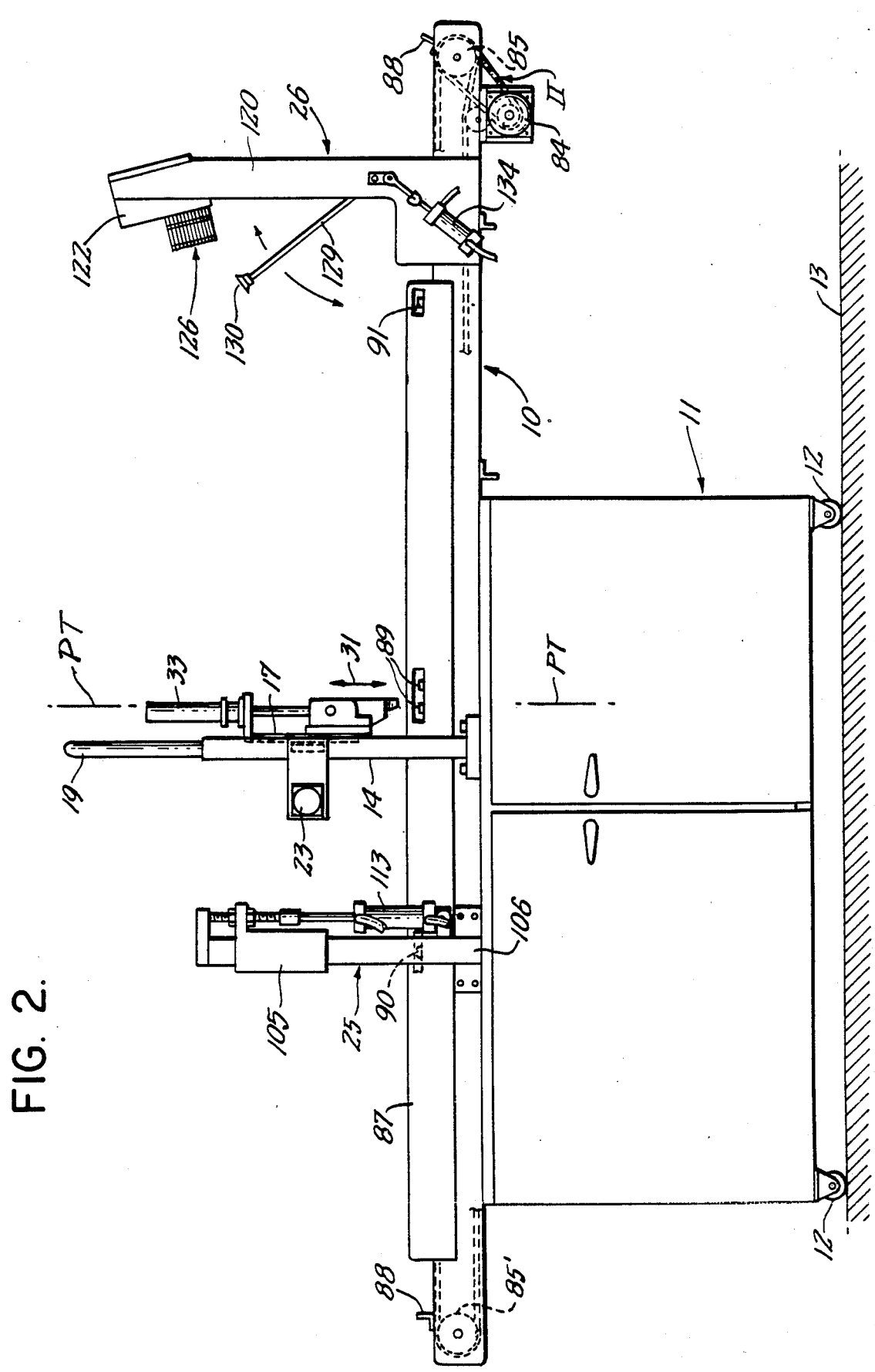
FIG. 2 is a front view in elevation, as seen from the operator's side of the machine.
Figure 3:
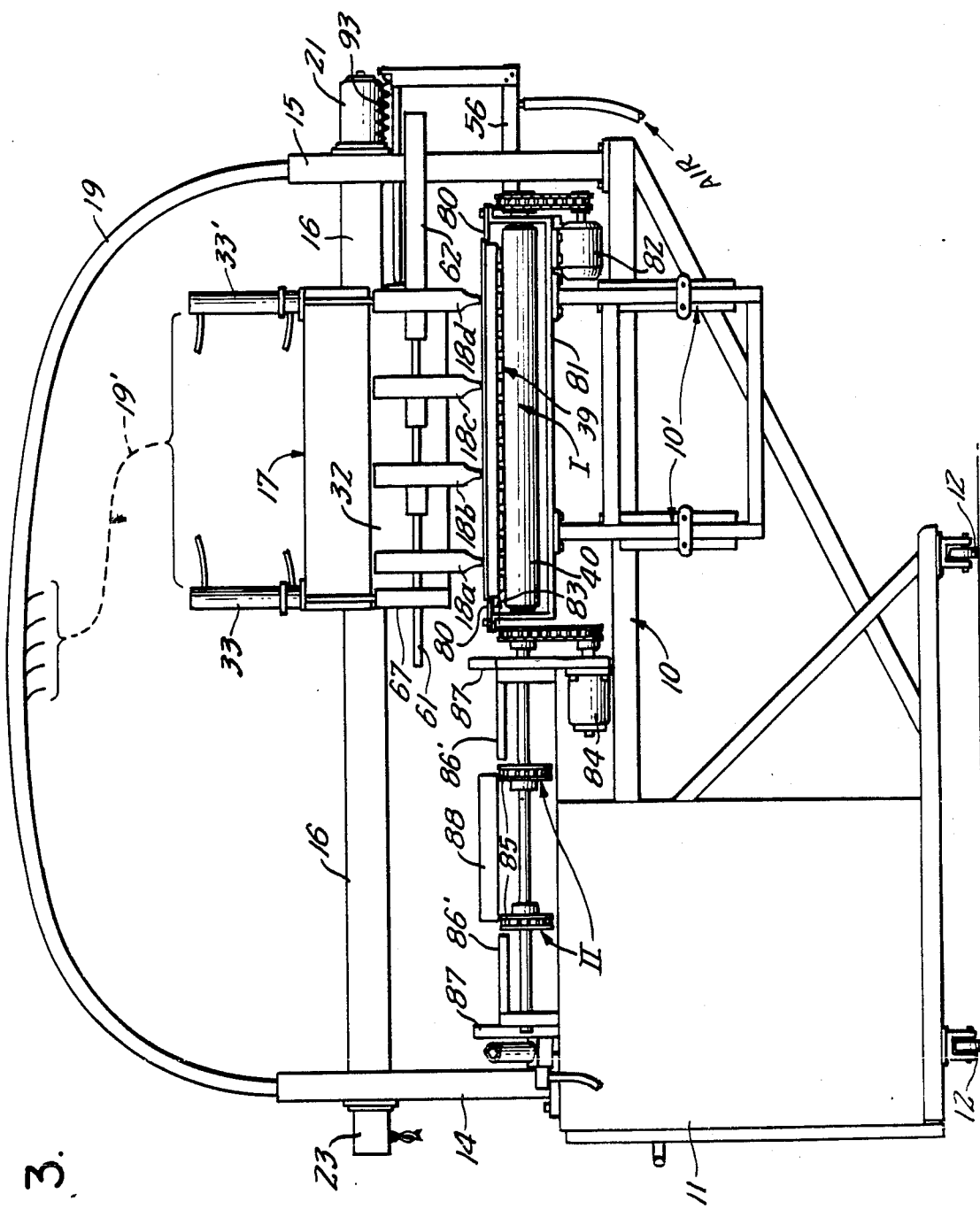
FIG. 3 is a right-end view in elevation.

In FIGS. 1, 2 and 3, the transplanting machine which embodies the invention is seen built upon a table frame 10 carried by a cabinet 11 which is equipped with casters 12 for a degree of selective mobility, as upon a greenhouse floor 13. Two endless conveyor systems I–II run parallel horizontal courses, in side-by-side adjacency in the table frame; conveyor system I is operated in predetermined intermittent incremental steps (from right to left, in the sense of FIGS. 1 and 2) to present trays or flats of germinated seedling plants for pick up and transplant action at a precise vertical plane PT which is designated by legend in FIG. 2, and conveyor system II is operated in suitably synchronized different intermittent incremental steps (from left to right, in the sense of FIGS. 1 and 2) to present sodded and dibbled trays for transplanting reception of transported seedling plants that have been picked up from trays or flats on conveyor I.

Upstanding standards 14–15 are frame-based and provide steady positioning support for the ends of an elevated traverse guide rail 16 which spans both conveyor systems I–II near the vertical plane PT. A carriage 17 is guided for traverse displacement along guide rail 16, and plural picking heads 18a, 18b, 18c, 18d are mounted in transversely spaced array on carriage 17, being positioned for plant pickup, transport and discharge action in the plane PT of FIG. 2. Arched conduit structure 19 connects the upper ends of standards 14–15 and bridges all mechanisms, to serve electrical and pneumatic supply, control and feedback connections between computer and power supply equipment contained in cabinet 11, and various actuated and sensing devices on carriage 17 and at the conveyor-I side of the machine. Flexible connections to actuated and sensing devices on or movable with carriage 17 are suggested schematically at 19', the same being suspended from the central region of structure 19.

The transverse displacement and positioning of carriage 17 is under control of a lead screw 20 journalled in brackets mounted to the respective standards 14–15, and reversibly driven by a motor 21. A lead nut 22 (suitably a ball-track lead nut) is fixed to carriage 17 and therefore provides the following connection needed for carriage displacement and positioning. An angle-displacement sensor 23 is driven by lead screw 20 and provides a digital output whereby exact carriage positioning can be predetermined by and known at all times to the computer.

Conveyor system II is actually a production line wherein transplant action at the plane PT is but one of several successive operations. For example, a dibbling station 25 is shown in FIGS. 1 and 2, in advance of transplanting at plane PT, and an automatic tagging station 26 is also shown at a location sufficiently subsequent to the transplant location PT to allow an operator time to inspect for, and to correct for, any infidelity of transplanting operations.

The foregoing mechanisms will be later described in detail, following a detailed description of plant pickup and discharge mechanism which is central to the invention. For this purpose, first additional reference is made to FIGS. 4 and 5, which show one of the plural picking heads, generally designated 18.

The picking head 18 is seen to comprise a generally prismatic body 30 which, as suggested by a double-headed arrow 31 is subject to up-down reciprocation. The rear face of body 30 is mounted to a slide plate 32 which is guided by means 17' on carriage 17 for vertical displacement, under the actuating force provided by doubleacting pneumatic cylinder means 33, which in turn is fixedly mounted to carriage 17. The lower surface of body 30 is characterized by a truncating downward slope 34 and by a relatively narrow downward projection 35 which, at the downwardly projected limit of the vertically guided reciprocation of slide plate 32 (as determined by an adjustable stop 32' and/or by conveyor-elevation adjustment means 10' of FIG. 3), places the lower end of projection 35 at substantially the fill level of the tapered plug or "root pack" 36 of a germinated seedling 37; seedling 37 is shown contained in a cellular pocket 38 of a multiple-cell flat 39 that is supported on the indexable belt 40 of the conveyor-I system. Above the projection 35, body 30 has a cavity 41 having parallel vertical side walls, tangent to semicylindrical upper and lower ends of the cavity. A flat front panel 42 is removably secured to body 30, to complete closure of the cavity in a vertical plane which is parallel to the back wall of the cavity. When panel 42 is thus installed, a piston element 43, as of Teflon, has self-lubricated guided running clearance with the described vertical walls of the cavity, and is subject to pneumatically driven up and down actuation via passages 44–45 which communicate with the upper and lower ends of the cavity. Solenoid-operated valve means 46 (FIG. 1) having flexible connections 44'–45' to passages 44–45 will be understood to reversibly provide pressure-fluid supply and exhaust functions to selectively drive piston 43 to its up and down limits of displaceability in cavity 41.

The body 30 is preferably of non-magnetic material, such as aluminum, and a permanent-magnet plug 47 carried by piston 43 generates an electrical interlock signal via magnetic-sensing means 48 carried by the front closure plate 42 (also of non-magnetic material, but preferably stainless steel), upon achievement of or departure from the upper-limit position of piston 43. The front face of piston 43 is characterized by four shallow vertical grooves for aligned parallel retention of an equal plurality of bent spring fingers or prongs 50, clamped by non-magnetic means 49 and projecting below piston 43. Each of these prongs rides its own one of an equal plurality of vertical guide grooves 51 in the front face of the lower projection 35 of body 30, and prongs 50 are captive in these grooves after face plate (42) assembly to body 30. The length and nature of prongs 50 are such that in the up position of piston 43, all prongs are compliantly constrained to relative straight alignments, by reason of their captive retention by grooves 51 and plate 42; on the other hand, in the down position of piston 43, the bent lower projecting prong ends are free to assure their bent divergent/convergent unstressed orientations, as suggested by the showing of FIG. 4. Prongs 50 may suitably be of 0.016-inch diameter piano wire; the upper halves of the lower projecting portions of these prongs are straight and parallel for substantially the extent of the stroke of piston 43, and it is essentially only the remaining lower half which is characterized by the indicated bends, each of which is preferably arcuate and tangentially continuous with the straight half of the same wire prong.

Figure 5:
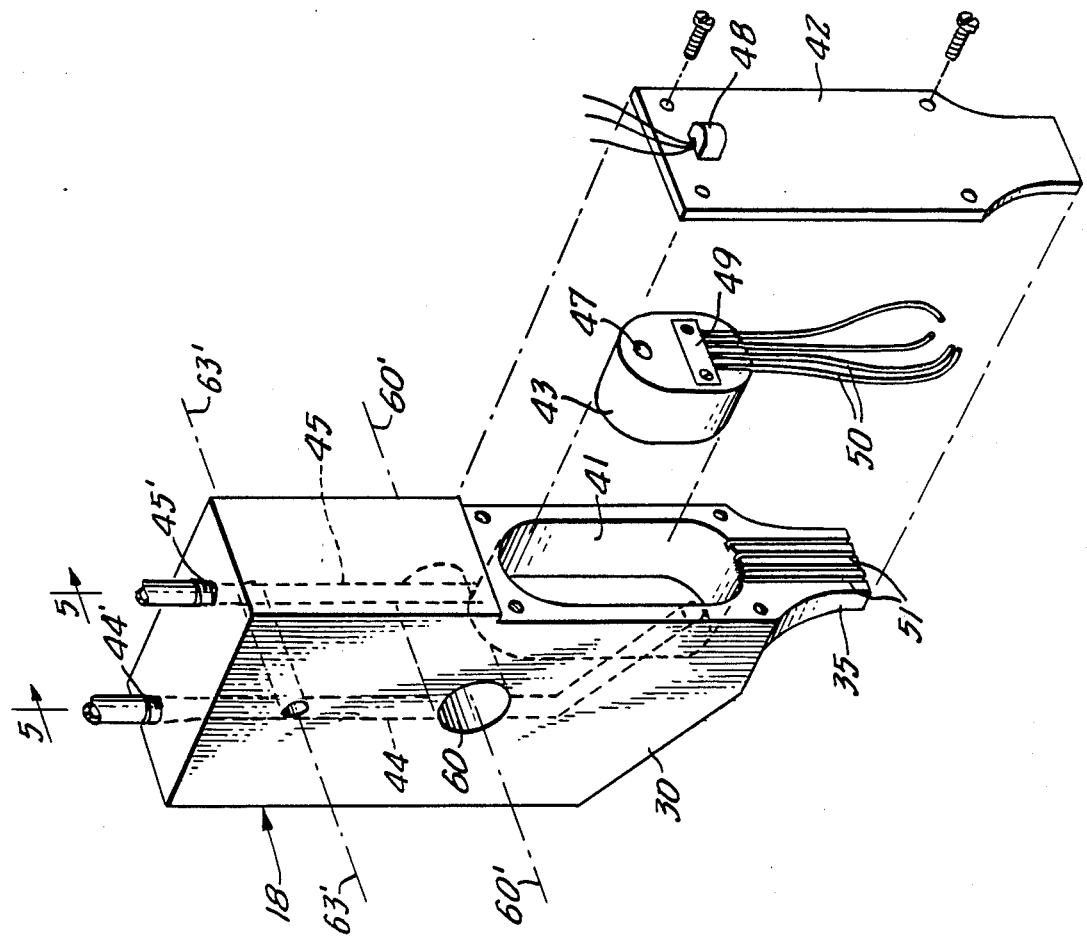
FIG. 5 is a vertical section, taken for the assembled picking head and in the plane 5—5 of FIG. 4.

The cycle of picking-head operation involves coordinated sequencing of the two indicated vertical reciprocations, each of which is pneumatically driven and double-acting, and each of which will be understood to be under solenoid-actuated reversing-valve control, through computer-coordinated timing of solenoid operations. Starting from the raised position of slide plate 32 and with piston 43 also in its upper position, a seedling 37 and its germination cell 38 will be understood to have been advanced by conveyor I to the pickup plane PT, wherein the lower projecting end 35 of the picking-head body is poised for descent to the fill level in cell 38 and safely offset from interference with the seedling. The first step is the downstroke of body 30, pursuant to cylinder-33 drive of slide plate 32 to the lower limit determined by adjustment of stop 32'; this first step positions body 30 in the relation to seedling 37 and its cell 38, all as shown in FIG. 5, but with piston 43 still in its upper (retracted position). The second step is the downstroke of piston 43, in the course of which downstroke the lower end of each of the prongs 50 is progressively freed of its compliant constraint and is thus enabled to determine its own curvilinear path into the porous volume of the root plug 36 in cell 38; the specific path for the prong 50 shown in FIG. 5 is seen to curl well into the lower volume of plug 36 and beneath the vertical alignment of the stem of seedling 37, and other prongs 50 will at the same time be understood to have achieved their own different arcuate entries into the lower volume of the plug, in relatively converging-/diverging relation to each other.

It is the nature of commercially available germination-tray flats, such as flat 39, that they are of suitable plastic material that has been slumped to define a two-dimensional array of cells 38, with each cell tapered and of generally the configuration of a square geometric pyramid that has been truncated at the cell bottom. The taper facilitates removability of root plugs, as does also the inherent relatively smooth and low-friction property of the involved plastic material. The seedling will be understood to have been germinated and grown to transplantable stage in a conventional environment of vermiculite particles with suitable nutrient additive, and with intermittent watering; and an aperture (38') in the bottom of each cell will be understood to have allowed sufficient breathing of moisturized air within the vermiculite, for such full root development as will have consolidated the plug 36, when the seedling is ready for transplanting.

In view of the consolidated nature of the root plug 36 and in view of the tapered and low-friction nature of the walls of the cell 38 in which plug 36 has been developed, the described plural entries of prongs 50 provide such positive engagement of head 18 to plug 36 as to enable rapidly accelerated upward displacement of head 18, without loss of the plug (and seedling) carried via prongs 50. The third step of the cycle of head 18 is thus the upward actuating stroke of cylinders 33, whereby slide plate 32 and all picking heads 18 are simultaneously raised. Traverse displacement of carriage 17 then carries all the picking heads to discharge alignments involved in transplanted discharge of the picked seedlings at conveyor II; the precise positioning for transplant alignments is a matter for later discussion. But once in correct transplant alignment, the fourth step in the picking-head cycle can proceed; this fourth step is a downstroke actuation by cylinders 33 while piston 43 remains in its down position, i.e., while still retaining a positive hold of the involved root plug (36). When the downstroke of slide plate 32 is arrested by stop 32' (and carriage 17 is over the transplant-receiving conveyor II), this downstroke limit will be understood to have positioned the involved root plug in the predibbled soil concavity of a larger-size cell which has been prepared for transplant reception.

Having thus positioned root plug 36 in its prepared and predibbled transplant environment, the fifth step in the picking-head cycle proceeds as an upstroke of piston 43, thus retracting all prongs 50 from their engagement with the root plug 36. Full prong retraction is certified by an electric-signal output of sensor 48, and this electrical signal is the trigger or interlock whereby the sixth step can proceed immediately, namely, a second retraction (upstroke) of slide plate 32 and its picking heads 18 (*a, b, c, d*) under actuating control of cylinders 33; once heads 18 have been retracted, carriage 17 is returned to its next registration over conveyor I, in readiness for another multiple-seedling cycle of pickup (over conveyor I), and discharge (over conveyor II).

Figure 4:
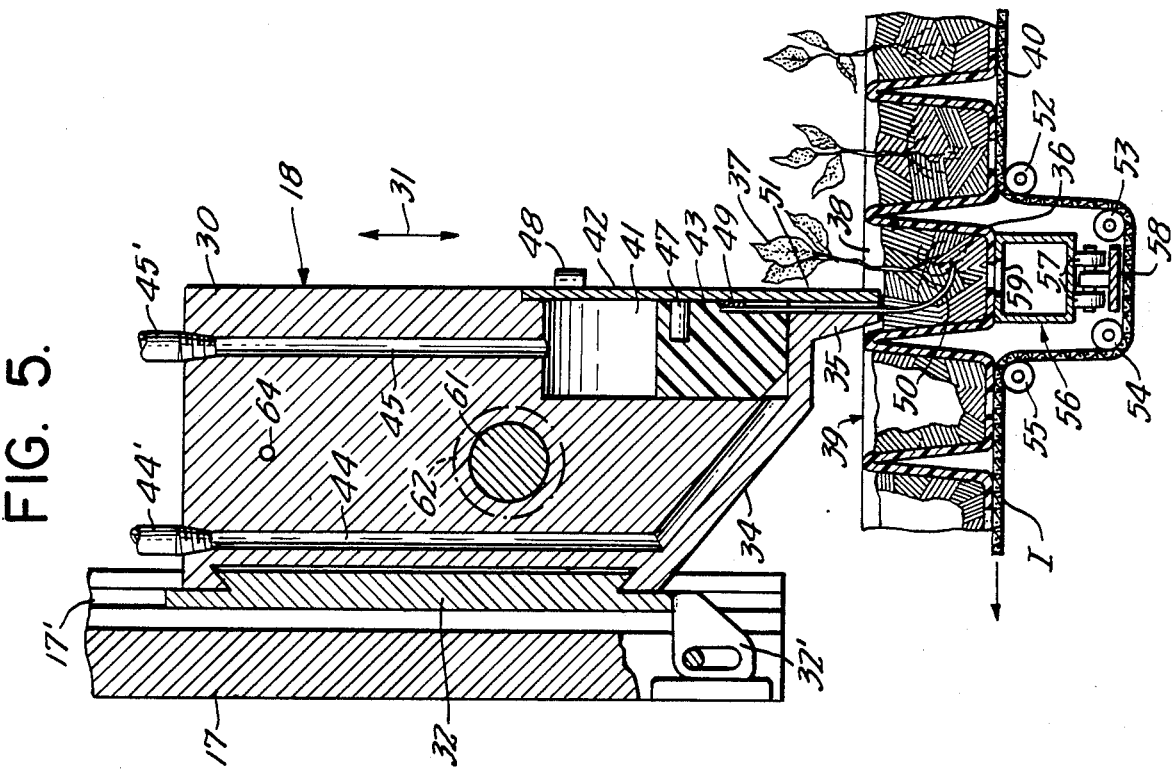
FIG. 4 is an enlarged and exploded view of a picking-head assembly used in the machine of FIGS. 1 to 3.

To complete a description of FIGS. 4 and 5, a series of guide rolls 52, 53, 54, 55 is seen to determine a downwardly offset detour of the belt 40 of conveyor I to accommodate further structure beneath the bottom of the cells (38) from which seedlings (37) are to be extracted. This structure is an air manifold 56 shown in greater detail in FIGS. 8 and 9; manifold 56 is elongate and horizontally displaceable in the plane PT of picking, transport and discharge, being supported by rolls 57 mounted to a transverse bar 58 that is fixedly suspended from the table frame 10. The coordination and actuation of manifold 56 will be discussed in greater detail in connection with FIGS. 8 and 9, and it suffices here to state that manifold 56 is characterized by spaced upper-wall apertures 59 which register with the bottom aperture of each cell (38) when its root plug (36) is to be picked up by one of the picking heads 18. The computer-controlled delivery of a short blast of compressed air via manifold 56 and its aperture 59, in timed correlation with the above-described third step of the picking-head cycle will be understood to provide still further assurance of a clean root-plug snatch from cell 38 at commencement of said third step, namely, head 18 retraction while piston 43 is in its down position.

Finally, FIGS. 4 and 5 show a first transverse cylindrical bore 60 having sliding fit to a transverse bar 61 which is the actuating rod of a double-acting air cylinder 62 for a picking-head spacer mechanism, to be described in connection with FIGS. 6, 6A and 6B. And a second transverse cylindrical bore 63 accommodates a flexible cable 64 (suitably, an aircraft control cable) forming a further component of said spacer mechanism. The spaced parallel-axis alignments of bores 60–63 are in FIG. 4 designated 60'–63', respectively. And a dovetail engagement of each picking-head body 30 to the slide plate 32 is shown providing additional support and guidance for any and all adjusted spacings between picking heads.

Figure 6:
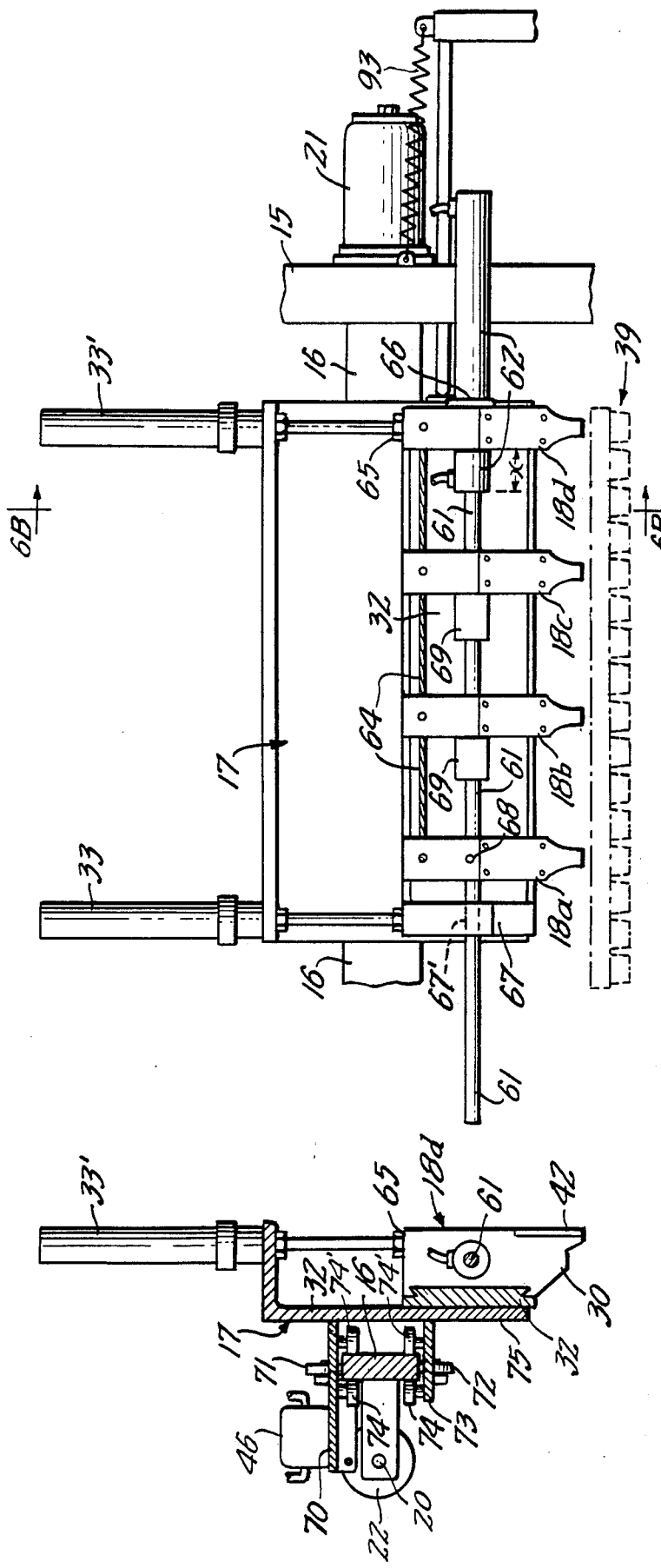
FIG. 6 is an enlarged view in elevation of a transport carriage which mounts plural picking heads of FIGS. 4 and 5, in a first equally spaced relation.

In FIGS. 6 and 6B, the piston rod of vertical actuator 33' is seen to act directly upon the picking head 18d, which will be understood to be fixed to (and, therefore, not slidable along the dovetail engagement to) slide plate 32; as shown, this rod engagement to body 30 of head 18d is threaded, and locked by means 65. This particular body 30 has a bore aligned with the bores 60 of the remaining head bodies 30, but of diameter accommodating the air cylinder 62, which is so fixed to head 18d as to present its head and tail pressure-fluid ports beyond opposite lateral sides of the picking head 18d; the extent x to which its tail-port end extends beyond head 18d in the direction of adjacent head 18c is adjustable, and collet means for securing the adjustment is suggested at 66. At the other end of carriage 17, the piston rod of the other vertical actuator 33 has similarly fixed engagements to a bracket 67 which is also fixed to slide plate 32; bracket 67 has a bore 67' for sliding support of the actuator rod of cylinder 62. The body 30 of only the outermost picking head 18a on rod 61 is fixed as by set-screw means 68 to rod 61, and further set-screw means will be understood to clamp the engagement of each of the bodies 30 of all picking heads 18 to cable 64, such that in the fully extended position shown for rod 61 in FIG. 6, cable 64 is tensed throughout and determines the relatively wide equal spacing of picking heads shown in FIG. 6. For a selected lesser but equal spacing x between adjacent picking heads (as in FIG. 6A), collet 66 clamps cylinder 62 to head 18d accordingly, and spacers 69 are selected for length x and positioned on rod 61, in the spaces between heads 18a–18b, and 18b–18c. A supply of retracting air pressure to the tail port of cylinder 62 is then operative to shift rod 61 from its FIG. 6 (extended) position, to its partially retracted FIG. 6A position, wherein the selected spacers (and the collet-clamped position of cylinder 62) determine the fixed distance x between each pair of adjacent heads. The extended-spacing relationship of FIG. 6 is once again quickly achieved by supplying pressurized air to the head-end port of cylinder 62, and by relying upon the described clamping of heads 18 to cable 64 to re-establish the equal-spacing relationship of FIG. 6. Of course, for reduced spacings other than the extent x, the described selection of and assembly to rod 61 of other spacers 69 of desired equal length, plus the collet adjustment to adapt cylinder 62 to the same equal-spacing capability, readily completes the adaptation of picking-head spacing to a changed variety of germination-cell flat to be used in place of the flat 39.

FIGS. 6B and 8 provide further detail of suspension structure for carriage 17 in association with guide rail 16, and the positioning drive provided by lead screw 20, lead nut (ball nut) 22, motor 21, and the angle-tracking sensor 23; and in FIG. 8, the shelf bracket 70 which mounts solenoid valve 46 is broken-away, for a better showing of carriage suspension. Guide rail 16 is of rectangular section, providing four guide surfaces for carriage 17. Spaced upper rollers 71 mounted to the ends of shelf bracket 70 use the upper surface of rail 16 to sustain the gravitational load of carriage 17; spaced lower rolls 72 mounted to the ends of a lower shelf bracket 73 of carriage 17 ride the lower surface of rail 16 to stabilize carriage orientation even when rapidly accelerated from operations at one to the other of the conveyors I and II; and spaced upper and lower pairs of rolls 74 carried by shelf brackets 70–73 all ride one vertical face of rail 16 (while similar upper and lower pairs of rolls 74' ride the other vertical face of rail 16) to thereby stabilize the orientation of carriage 17 at all times. Anti-friction bearings in brackets 76–66 fixed to rail 16 provide precision support for the operative ends of the lead screw; and a torsionally rigid, axially flexible coupling 78 connects the lead screw to its drive motor 21, shown independently mounted to the standard 15. The angle-tracking sensor 23 also has torsionally rigid connection at 79, to the other end of the lead screw.

Reference is again made to FIGS. 1, 2 and 3 for further description of the conveyor systems, which have their own independent incremental-advance drive mechanisms, each appropriate to the cell and cellspacing dimensions of the cell sheets they are to serve for a particular job. In the illustrative case shown (see FIG. 3), the particular size of germination flat 39 is 16 cells wide; it rides on the endless belt 40 of conveyor I, and its lateral position on belt 40 is stabilized by edge guides 80 which will be understood to be adjustably secured to side-wall flanges of the channel-shaped frame 81 which mounts end rolls and intermediate rolls such as the rolls 52 to 55 (FIG. 8). A motor 82 has chain-drive connection to at least one of these rolls; and, between rolls which determine the support plane of germination flats, it will be understood that strips or plates (not shown) are provided to maintain fidelity of the flat-supporting plane of belt 40. For any given plug-flat configuration on conveyor I, the incremental advance of belt 40 must be precisely the particular longitudinal spacing between adjacent transverse rows of the cells; but rather than estimate or predict what this incremental advance should be, we prefer to incorporate one or more commercially available electro-optical LED and photodiode sensor units in one of the side walls of channel frame 81, the same being schematically suggested by a transversely directed arrow 83 in FIGS. 3 and 8. Since individual cells are the product of slumping from plastic sheet material, the lower ends of cells of a given plug flat can be individually observed in contrast to intervals between adjacent-cell walls, and an electrical-signal output will reflect detection of the observable contrast and, thus, the exact belt (40) position at which a newly advancing transverse row of cells is correct, for seedling pickup action in the plane PT. The output signal from means 83 will thus not only be understood to be connected (via the computer) to stop the drive motor 82 of conveyor I, but also (via the computer) to initiate a succession of transplanting operations by the picking heads 18, in coordination with traverse shuttling of their carriage 17.

Conveyor II must independently advance its transverse rows of transplant cells at intervals and by incremental extents which accord with basic transplant-cell dimensions. A typical such size, suitable for marketing in a cluster of four cells, provides a ¼-inch wide outer peripheral flange, surrounding a 2×2 array of like rectangular cells, on 2-inch centers in the longer dimension, and on 1⅜-inch centers in the shorter dimension; the cells have inwardly tapered walls, to a depth of 2½ inches. Each cluster of four cells is separably formed in conjunction with plural adjacent clusters, which typically may be four clusters wide (in the longer cell dimension), and three, four, six, eight or ten clusters long (in the shorter cell dimension). Unitary potted and dibbled cell arrays to be handled by conveyor II may thus illustratively be 18 inches wide and 11 or more inches long, depending upon the number of clusters in the longitudinal direction of conveyor II advance; one such unitary array is exposed to view near the dibbling station 25 in FIG. 1.

As with conveyor I, conveyor II is seen to have its own drive motor 84, but it comprises two spaced endless chains between pairs of sprockets 85 at one end, and 85' at the other end, the motor (84) drive-chain connection being via an outboard sprocket on the shaft of sprockets 85. Transplant-cluster arrays ride the conveyor II on flat-supporting surfaces 86–86' between and on lateral sides of the two sprocket chains, and lateral location is stabilized by side-plate guides 87. Incremental advancing drive forces are imparted by longitudinally spaced transverse bars 88, connected to both sprocket chains. Again, precise longitudinal location of the larger-cell rows which reach the plane PT is ascertained by sensor means 89 which may be as described for conveyor I, responding to observed light contrast as between the existence or non-existence of a cell wall in the transversely directional optical response axis of the sensor means. The optical sensor means 89 is shown mounted in one of the side plates 87, and similar provision is also shown at 90 and 91 for purposes of coordinating dibbling and tagging operations at 25 and 26, respectively, to be later explained.

Figure 7:
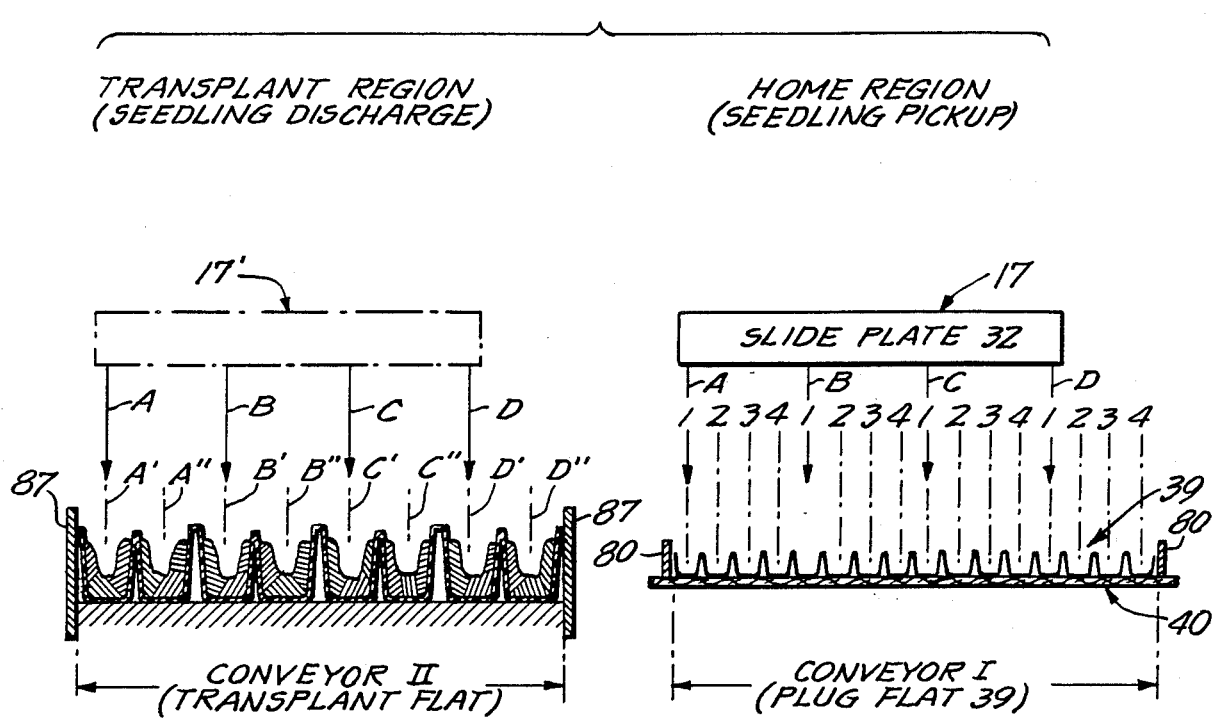
FIG. 7 is a schematic diagram, generally conforming to relative positions shown in FIG. 3, but for the purpose of implementing description of successive cycles of seedling pick-up and discharge, in operation of the machine of FIGS. 1 to 3.

At this juncture, it is helpful to proceed, event by event, with an illustrative computer-controlled, automated transplanting of germinated plants from the two-dimensional cell array of the plug flat 39 on conveyor I, to the larger-cell arrays in multiple clusters as described on conveyor II. FIG. 7 is in aid of such a discussion and is devised to schematically show carriage 17 with its four picking heads 18, now identified as A, B, C and D, respectively. Seedling pickup is at specifically identifiable transverse locations within a "Home" region over conveyor I; in this region, carriage 17 appears in solid schematic outline. Seedling transplant is at specifically identifiable transverse locations within a "Transplant" region over conveyor II; in this region, carriage 17 appears in phantom outline. The plug flat 39 in FIG. 6 is shown to comprise sixteen cells in the width dimension, and flat 39 will be taken as having such effective overall width (i.e., substantially the 18-inch width already described for a particular unitary cell-cluster array of the larger transplant-receiving cells on conveyor II), that the center-to-center spacing of germination-flat cells is 1⅛ inches. The spacing between heads A, B, C, D on carriage 17 is 4½ inches, so that four differently preselected pickup locations of carriage 17 are needed within the "Home" region, in order to exhaust the supply of seedlings in a given row, by performing four cycles of seedling pickup. The same 4½-inch spacing between heads A, B, C, D is correct for serving every other filled and dibbled cell in a given row of eight on conveyor II, so that two differently preselected locations of carriage 17 are needed within the transplant region, in order to make all transplants in a given row. The legends in FIG. 7 use subscript numbers to identify the needed four different carriage positions in the "Home" region, and single-prime and double-prime notations are employed to differentiate head positions at the two different transplant-region locations.

Beginning with the situation depicted in FIG. 7, namely, with carriage 17 positioned in the "Home" region, with picking heads A, B, C, D positioned to register with the first (leftmost) of every four cells of plug flat 39, cyclic operations are computer-controlled in the following succession of events:

(1) Seedling pickup, picking heads 18 in #1 positions ($A_1$, $B_1$, $C_1$, $D_1$)
(2)—Slide 32 and all heads 18, downstroke, by actuators 33–33'
(3)—Prongs 50 (pistons 43) downstroke, to engage plugs
(4)—Slide 32 (heads 18), upstroke, by actuators 33–33'
(5) Traverse carriage 17 and all plug-laden heads, to transplant positions A', B', C', D'
(6)—Heads 18 (slide 32), downstroke, positioning plugs in pre-dibbled pockets
(7)—Prongs 50 (pistons 43), upstroke, to disconnect plugs from heads
(8)—Slide 32 (heads 18), upstroke
(9) Return-home traverse of carriage 17 to #2 head positions ($A_2$, $B_2$, $C_2$, $D_2$)
(10)—Slide 32 (heads 18), downstroke
(11)—Prongs 50 (pistons 43), downstroke
(12)—Slide 32 (heads 18), upstroke
(13) Traverse carriage 17 and all plug-laden heads, to transplant positions A", B", C", D"
(14)—Heads 18 (slide 32), downstroke
(15)—Prongs 50 (pistons 43), upstroke
(16)—Slide 32 (heads 18), upstroke
(17) Return-home traverse of carriage 17 to #3 head positions ($A_3$, $B_3$, $C_3$, $D_3$); concurrently, indexing advance of conveyor II, by one row of cells of transplant flat
(18)—Slide 32 (heads 18), downstroke
(19)—Prongs 50 (pistons 43), downstroke
(b 20)—Slide 32 (heads 18), upstroke
(21) Traverse carriage 17 and all plug-laden heads, to transplant positions A', B', C', D'
(22)—Heads 18 (slide 32), downstroke
(23)—Prongs 50 (pistons 43), upstroke
(24)—Slide 32 (heads 18), upstroke
(25) Return-home traverse of carriage 17 to #4 head positions ($A_4$, $B_4$, $C_4$, $D_4$)
(26)—Slide 32 (heads 18), downstroke
(27)—Prongs 50 (pistons 43), downstroke
(28)—Slide 32 (heads 18), upstroke
(29) Traverse carriage 17 and all plug-laden heads, to transplant positions A", B", C", D"; indexing advance of conveyor I, by one row of cells of plug flat 39

(30)—Heads 18 (slide 32), downstroke (31)—Prongs 50 (pistons 43), upstroke (32)—Slide 32 (heads 18), upstroke

(33) Traverse carriage 17 to #1 head positions ($A_1$, $B_1$, $C_1$, $D_1$); concurrently, indexing advance of conveyor II, by one row of cells of transplant flat

[Note: Step 33 brings all conveyor-indexing, carriage-shuttling, slide (32)-reciprocation, and piston (43)-reciprocation cycles back to the starting situation of step (1) above; further steps are therefore repetition of steps (2) to (33)].

The foregoing enumeration of steps (1) to (33) will be understood to have been simplified, to make clear the succession and interrelation of variously interlaced double-acting subcycles.

For example, certain interlock or feedback signals to the computer have been omitted, such as (a) the LED/photodiode or other sensor functions in determining single-row indexing advance of the respective conveyor systems, (b) count-up and count-down functions associated with the digital processing of incremental lead-screw angle-tracking output pulses of sensor 23 and their comparison with computer-program pulse counts identifying each of the illustrative four "Home" region positions of carriage 17, as well as each of the two "Transplant" region positions (prime and double-prime notations) of carriage 17, (c) the magnetic-sensor interlock signal produced by means 47/48 to certify full retraction of all prongs 50 from involved root plugs deposited in pre-dibbled cavities, and (d) the air blast delivered by manifold 56 to the base opening of each relevant plug-flat cell, coincident with each plug-lifting upstroke of slide 32 in the "Home" region of conveyor I.

Further description of the air-blast functioning of manifold 56 will now be given, with specific reference to structure best shown in FIGS. 8 and 9, it being recalled that manifold 56 is guided by rolls 57 for transverse displaceability in a range which at least equals the distance between the No. 1 and No. 4 positions of carriage 17 in the "Home" region. This is so because manifold 56 will have been selected for use with the wide picking-head spacing (e.g., of FIGS. 6 and 7), i.e., with its blast apertures simultaneously registrable with the base opening of every fourth cell of the plug flat 39. In the form shown, this is achieved by slide/guide structure fixed to the outer end of manifold 56 and preloaded by a tension spring 93 to urge a rod 94 into position-tracking abutment with carriage 17, as long as it is in the "Home" region, above conveyor I; the complete structure involves an offset arm 95 connecting manifold 56 to rod 94 at a location outboard of the standard 15, and rod 94 derives guidance form a bore in standard 15. As long as carriage 17 is positionable in any of its four locations in the "Home" region, the span S of manifold displaceability allows correct registration of manifold apertures 59 with relevant plug-flat cells from which seedlings are currently being removed, but when the lifted seedlings are up and being displaced with carriage 17 to the "Transplant" region of conveyor II, the manifold air-blast function is no longer needed, and arm 95 interception by standard 15 is operative to limit manifold displacement to no further than necessary.

In our experience to date, the described picking-head operations, in conjunction with carriage (17) traverse and conveyor I and II indexed advances (as appropriate), have been applied to different configurations and sizes of plug flat 39, in relation to the same and different transplant-cell size and clustered configuration. For example, a presently commercial germination flat provides as many as 30-cell rows, with cells on $\frac{5}{8}$-inch centers, for an overall width of 21 inches, i.e., slightly exceeding that of the above example. In adaptation to the smaller cells of this commercial flat, and with a picking-head spacing of the same $4\frac{1}{2}$-inches, each pick-up cycle of slide 32 can be operative to extract a seedling from every seventh cell, so that seven such cycles can pick up and transplant seedlings from 28 of the 30 cells in a row, before conveyor-I indexing to the next row; in the course of these same seven cycles, transplanted seedlings will have filled three and one half rows of the described larger transplant cells on conveyor II.

As a practical matter, transplanting seedlings in 28 of the 30 cells in each row of the plug flat can be viewed as being commercially attractive, in two alternate modes. In one case, having seeded for germination in all thirty of the cells in a row, and having automated the transplanting of seedlings from 28 of the 30 rows (for each indexed position of flat 39 on conveyor I), two germinated seedlings of each row will remain on the otherwise-empty flat emerging beyond the plane PT. Once the complete flat has cleared the plane PT, the unpicked seedlings in two cells of each row will be available as "spares", enabling the operator to manually fill a pre-dibbled large cell on conveyor II, in replacement of a transplant which did not germinate or which otherwise appears to the operator to be of less than optimum quality. In an alternative case, only 28 cells of each row need be prepared and seeded; i.e., economy may be desired by seeding only the 28 cells which are to be subjected to automated transplanting.

The above illustrations of use of our transplanting machine relate to use in which the same fixed spacing between picking heads 18 can serve spaced seedlings on flat 39 and spaced transplant locations on conveyor II. But the machine must be understood to have greater flexibility in its application to different relationships between spaced locations of seedling pickup on the one hand, and spaced locations of seedling transplant on the other hand. For example, the described spacing of heads 18 may be suitable for seedling transplantation in the cells on conveyor II but such spacing may not be suitable for seedling pickup from the plug flat, whereas a slightly reduced head spacing would be correct for pick-up of seedlings from the plug flat. In such event, spacers 69 and the collet (66) setting of the cylinder 62 offset x should be selected to determine this correct slightly reduced spacing, upon a retracting actuation of cylinder 62, and cyclic operation of cylinder 62 should be computer-coordinated with each shuttling traverse of carriage 17 between the two conveyor regions. Thus, with cylinder 62 retracted to limit picking heads 18 to the desired spacing x, all picking functions (viz. slide 32 downstroke, piston 43 downstroke, and slide 32 upstroke) can proceed at the preselected lesser spacing of these heads; then, during the short interval of driven displacement of carriage 17 to the "Transplant" region, cylinder 62 is caused to project head 18a, and (via cable 64) also to displace the other heads 18b and 18c, to the larger equal spacings needed for transplant-cell registration. Of course, on the return traverse of carriage 17 to the "Home" region, cylinder 62 is actuated in retraction to the reduced, spacer-limited, equal spacings x needed for the next picking cycle of heads 18.

Figure 10:
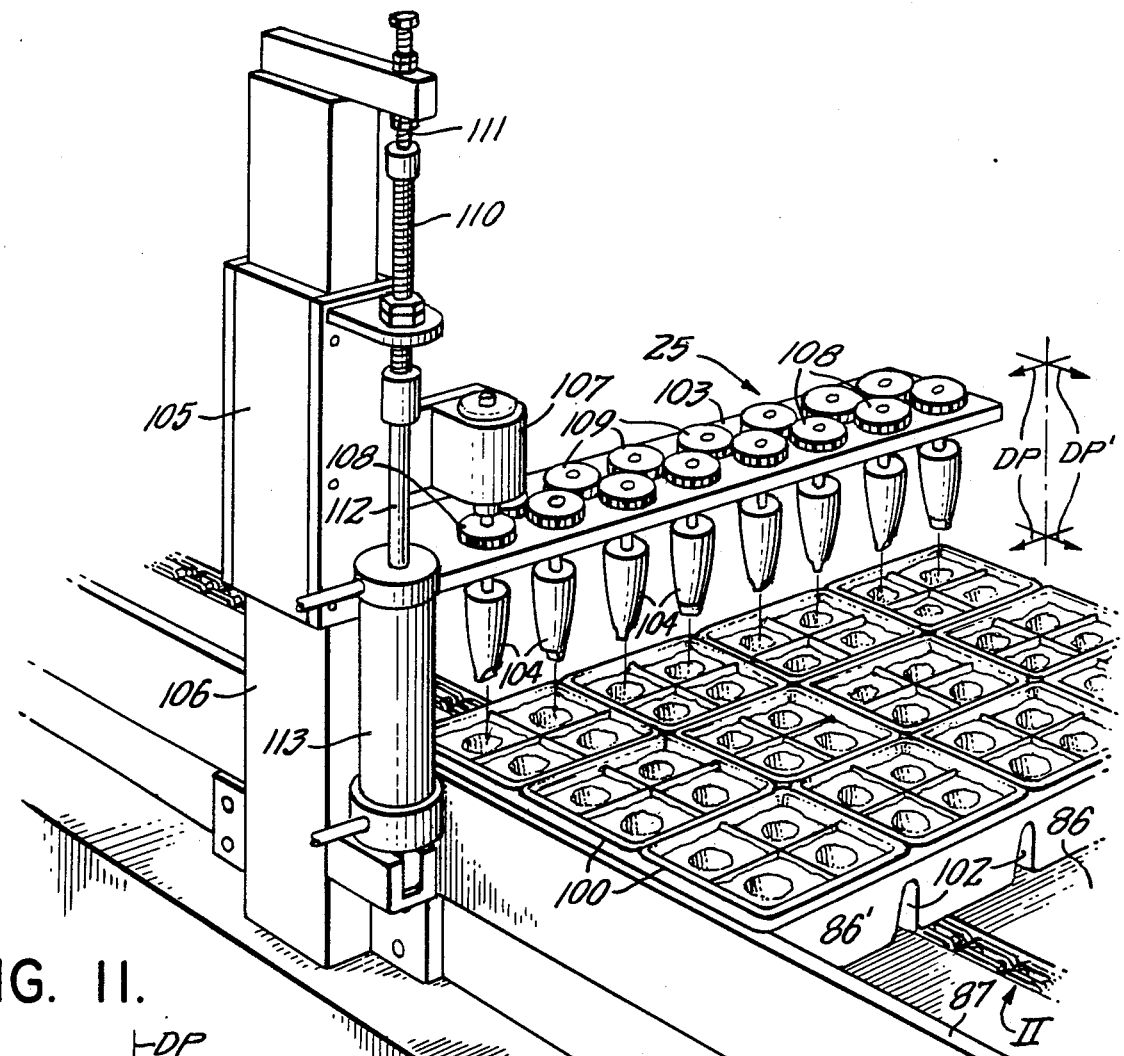
FIG. 10 is a perspective view of dibbling mechanism in the machine of FIGS. 1 to 3.
Figure 11:
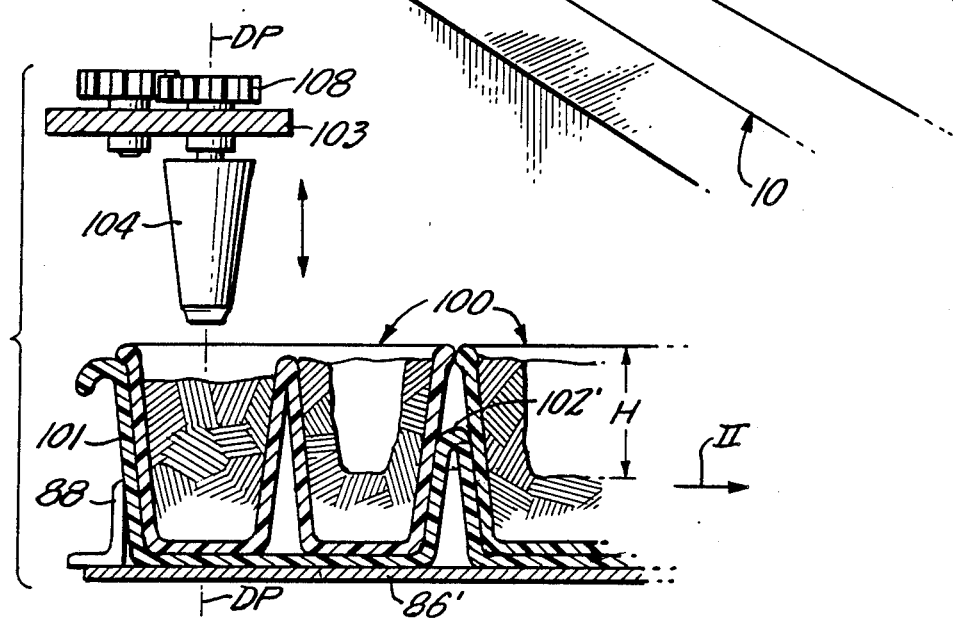
FIG. 11 is an enlarged fragmentary vertical section through one of the dibbling elements of FIG. 10 and taken in a plane parallel to the path of movement associated in soil-filled potting compartments awaiting transplant operations.

FIGS. 10 and 11 illustrate detail of the dibbling station 25 along conveyor II, in the context of twelve 2×2 clusters 100 of presodded transplant cells, wherein the clusters are arrayed as three rows (long) and four rows (wide), and wherein each cluster (100) is precisely positioned by the confining side walls of a pan 101 having a bottom that is formed with a grid of cluster-engaging ribs 102; thus, for pan 101 as shown, the grid comprises three longitudinally extending parallel ribs 102, integrally united with two transversely extending parallel ribs 102'. For such a means of retaining the cluster array, it is clear that the above-described operation of LED/photodiode sensors 89 will only be operative to observe indexing of pan 101 on conveyor II by contrast identification within the concavity of each passing rib 102; however, having provided two such sensors 89 in correctly spaced relation, one such sensor can control conveyor II indexing to plane PT for the first row (and odd-numbered rows) of cells in pan 101, while, in interlaced succession, the other such sensor can control conveyor-II indexing to plane PT for the second row (and even-numbered rows) of cells in pan 101.

Dibbling engagement with soil-filled cells proceeds in multiple, in a single vertical plane DP, and once for all of the cells in each successively indexed row; in FIG. 10, this single dibbling plane contains arrows DP, and arrows DP' are in a vertical plane parallel to the plane of FIG. 11 and to the directional path of conveyor II. A transverse arm 103 mounts individual dibbling tools 104 (and their associated drive pinions 108) for rotation in the plane DP, in laterally spaced multiple and at locations appropriate to the center of each soil-filled cell in the row that has been indexed into the plane DP. Arm 103 is a unitary component of a vertical slide 105, shown guided by the rectangular section of a vertical post 106 that is securely mounted to the machine frame 10. An electric motor 107 carried by slide 104 is shown directly connected to the shaft of one dibbling tool and its associated pinion 108, and idler pinions 109 mesh with adjacent drive pinions 108 to assure like dibbling-tool rotation on the central axis of each cell in the plane DP. Slide 105 is shown in its upper position, clear of the path of indexing advance of cell clusters and their retaining pans 101 on conveyor II. This upper position has been determined by the head of a threaded rod 110, upon abutment with a vertical stop 111 on post 105; and rod 109 is effectively the extension of the piston rod 112 of a double-acting cylinder 113 that is mounted to post 106.

The spacing between successive push bars 88 carried by the sprocket chains of conveyor II will be understood to be such that when a row of soil-filled and dibbled cells (in one pan 101) is positioned for transplant reception at plane PT, a corresponding row of cells (in the next pan 101) is positioned for dibbling in the plane DP. And it will be recalled that, for the described operational examples, each indexed position of conveyor II is held for two transplant cycles, e.g., the computer-based interval determined by and between events (1) to (17), described in connection with FIG. 7. During this interval, the computer will be understood to control the air-driven operation of actuator 113, for a downstroke from its upper position (shown) to its lower position of dibbling-tool penetration to a predetermined depth H in each cell of the involved row; the lower position is held for several seconds while all dibbling tools rotate to form a transplant-receiving cavity in the soil of each cell, whereupon an upstroke actuation by cylinder 113 returns all dibbling tools to their raised position. Motor 107 can be running continuously as long as the entire machine is operating; alternatively, sensor 90 may be used to control operation of motor 107 only for the period that a given pan 101 (and its array of soil-filled cell clusters) is sensed to be present at the dibbling plane DP. Description of the dibbling station is completed by identifying lock-nut means 114 whereby threaded rod 110 is adjustably related to slide 105, via a bracket element 115 of slide 105.

FIGS. 12, 13 and 14 illustrate detail of the tagging station 26 along conveyor II, in the context of pan 101 containing twelve 2×2 clusters 100 of cells, each of which contains a transplanted seedling having a root plug which has been positioned in a pre-dibbled cavity. The tagging station comprises spaced uprights 120 secured to the machine frame 10 on opposite sides of conveyor II. An inclined upper plate 121 establishes a bridge connection of the uprights and mounts plural supply chutes 122 for gravity feed of stacks 124 of individual plant-identifying tags 123, to a stack-limiting bottom plane from which tags can be singly extracted. The spacing between chutes 122 is such as to register with one of the transverse positions of picking heads 18 (a, b, c, d) when transplanting, e.g., in the respective vertical planes parallel to the directional advance of conveyor II and registering with the respective transplanting-head positions A', B', C', D' of FIG. 7. For tagging purposes in the assumed case of ultimately retailing individual 2×2 clusters, only one tag is needed per cluster, and therefore each tagging cycle is to be understood as being computer coordinated to occur in the first half of the every other dwell between indexing displacements of conveyor II; illustratively, therefore, the computer is programmed to utilize, for tagging purposes, only the interval between events (1) and (16), in the picking-head cycle described in connection with FIG. 7.

As best seen in FIG. 13, each tag 123 comprises a flat identification panel 124 oriented above an integrally formed spike tail 125, of V-shaped section for stiffening purposes; preferably, each tag is of sufficiently heavy-gage plastic or card material to exhibit the relatively stiffly compliant yieldability needed for tag extraction from the bottom of a stack 126 and for deflection at spike/panel juncture, in the course of spike insertion into its designated cell location, as will become clear. Single-tag extraction from the bottom of each stack 126 is by way of programmed vacuum-supply connection at 127 to a tubular manifold 128 which carries spaced tubular picker arms 129, each having an outer end that is fitted with an elastomeric suction cup 130 for selective engagement with the panel region 124 of a tag. Manifold 128 is journaled for angular rotation in both uprights 120, and is shown actuable by a crank 131, between a tag-picking upper location (dashed-line orientation of arms 129 in FIG. 12) and a tag-releasing lower location (solidline orientation of arms 129 in FIG. 12); these locations are limited by crank stops 132, 133, respectively, and are designated U and L for phantom-line limiting orientations in FIG. 14. And a double-acting pneumatic cylinder 134 mounted to the front upright 120 drives a rod and link connection to the crank arm 131.

FIG. 14 illustrates that the orientation of each chute 122 is such as to downwardly slope the face of tag panel 124 at the stack bottom at an angle $\alpha$ below the horizontal, such that, in approach of each arm 129 to its upper position U, the suction cup 130 has grazing, almost-tangential incidence with the panel 124 of the bottom tag. In the course of this approach, vacuum supply is cut off, but once in position U, the vacuum connection 127 is operative, to establish clean vacuum engagement to the involved panel 124. So strong is this engagement that, with the ensuing upstroke of actuator 134, manifold 128 and its arms 129 are angularly displaced for extraction of the engaged tag from its stack, and bodily rotation through an arc 135 to the lower position L. Just prior to attaining position L, the spike end 125 of the tag is shown (by solid outline) to have initial entry into the soil of its destination cell 136 at an angle $\beta$ of initial grazing incidence with the nearside inner wall of the cell, and in safe clearance relation with its newly transplanted seedling. In the course of final approach to the lower position L, spike 125 pilots along the cell wall while the spike/panel region compliantly bends, as suggested by phantom outline at 137, whereupon the vacuum supply is cut/off, for suction-cup disengagement and for picker-arm 129 return to position U for the next tag-picking cycle.

It will be seen that the described transplanting machine meets all stated objects and offers substantial improvement in speed and efficiency of existing techniques. Moreover, the machine is readily adaptable to various different germination-cell sizes and spacings, and to various different transplanted-cell sizes and spacings.

Although the invention has been described in detail for a presently preferred embodiment, it will be understood that modifications may be made without departure from the scope of the invention. Control circuit connections from the computer to the various described actuators (and sensor-feedback connections to the computer) have not been shown because they are within skills in the art, which skills include the provision of solenoid-operated valves for on/off or for double-acting control of the described pneumatically driven components. Similarly, the described on/off control of vacuum supply to the tagging mechanism 26 will be understood to involve a solenoid valve in line 127 to a vacuum pump contained in the cabinet 11.

Figure 15:
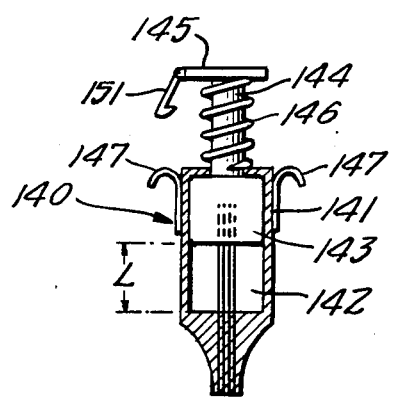
FIG. 15 is a simplified view vertical section of a hand tool in aid of optimum usage of the invention.

In the foregoing description, it has been indicated as desirable that "spares" of seedlings (with their plugs) be available to the operator, as indicated for the germination-flat size (30-cells wide), wherein 28 rows serve for automatic transplanting and wherein one or two remaining cells of each row are available for "spares" purposes. Of course, the operator must first visually identify the transplant-cell location at which the transplanted plug had an inadequately germinated seedling (or was otherwise unsatisfactory), and he can manually perform the transplantation of a "spare" seedling and plug, into the applicable dibbled cavity, using only his fingers and with the possible aid of a spatula or the like. However, the hand tool 140 of FIG. 15 (see sheet containing FIG. 7) is recommended and will be seen to operate on a principle close to that of the automatic picking heads 18. Specifically, this hand tool 140 comprises a body 141 having a cavity 142 in which a slide 143 can be reciprocated, over a stroke length L. A stem 144 is united to the upper end of slide 143 and projects beyond the upper end of body 141, being terminated by a thumb piece 145 and normally urged by spring means 146 to its raised position. Spaced lugs 147 on body 141 are available for finger engagement, in reaction to thumb depression at 145, to selectively impart the stroke L of slide 143; analogous to piston 43 of FIGS. 4 and 5, slide 143 carries plural prongs 150 which are guided in parallel ways formed in the reduced lower end of body 141. Thus, upon thumb-actuated depression of slide 143, and with the lower end of body 141 positioned at root-plug level in a cell containing a well-germinated "spare" seedling, the curved end halves of prongs 150 may be caused to enter the root plug; and as long as the thumb continues depressed (optionally retainable by latch means, schematically indicated at 151), the "spare" can be manually extracted from its germination cell and manipulated into the desired predibbled cavity, whereupon latch release will enable spring (146) withdrawal of all prongs 150 from root-plug engagement, prior to removal of tool 140 from the transplant locale.

What is claimed is:

1. A seedling pick-up and release device comprising a frame, a picking head guided with respect to said frame for vertical reciprocating strokes between upper and lower limits of picking-head reciprocation with respect to said frame, a picking slide guided on said picking head for vertical reciprocating strokes between upper and lower limits of picking-slide reciprocation with respect to said head, plural flexible prongs carried in spaced array by said picking slide and projecting downwardly below said picking slide, each of said prongs in unstressed condition extending in its own curvilinear course, guide means forming part of said head and individually guiding the lower ends of said prongs in substantially parallel vertically oriented array when said picking slide is in its upper limit of reciprocation with respect to said head; whereby, in the course of a downward stroke of said picking slide with respect to said head, the lower ends of said prongs will clear said guide means and embark on the respective curvilinear courses of their unstressed condition, and further whereby, in the course of an upward stroke of said picking slide with respect to said head, the lower ends of said prongs will be retracted into the substantially parallel vertically oriented array determined by said guide means; and selectively operable means for actuating said head and slide strokes in such timed relation that the slide downstroke follows the head downstroke for a seedling pickup and the slide upstroke follows the head upstroke for a seedling discharge.

2. The device of claim 1, in which said prongs are lengths of spring wire.

3. The device of claim 1, in which the unstressed curvilinear courses of said prongs are convergent with respect to each other.

4. The device of claim 1, in which the unstressed curvilinear courses of said prongs are divergent with respect to each other.

5. The device of claim 1, in which the unstressed curvilinear courses of said prongs are convergent/divergent with respect to each other.

6. The device of claim 1, in which each prong wire is bent to an arcuate course and in which the upper ends of the prongs are mounted to said slide in substantially the parallel vertically oriented relation of said guide means.

7. The device of claim 1, in which the curvilinear extent of said prongs is approximately the lower half and is approximately the length of said guide means, and in which the remaining upper half is straight and tangentially continuous with the curve of the lower half.

8. The device of claim 1, in which said picking slide is a piston and in which said picking head is a body having a cavity having a vertical guide length of constant section in which said piston is guided.

9. The device of claim 8, in which pneumaticsupply means in said head communicates with upper and lower ends of said cavity for double-acting actuation of said piston within said guide length.

10. The device of claim 1, in which said picking head is one of a plurality of picking heads in spaced array in a picking-head assembly wherein picking-head reciprocation involves the concurrent stroke actuation of all picking heads and the concurrent actuation of their respective picking slides.

11. The device of claim 1, in which said frame includes traverse-actuating means for the selective horizontal reciprocating displacement of said picking head between a pick-up region and a discharge region, said traverse-actuating means being so coordinated with said selectively operable means that (1) within the pick-up region the slide remains in its downstroke position for an upstroke of the head and for that downstroke of the head which follows head displacement to the discharge region, and (2) within the discharge region the head remains in its downstroke position, and (3) both said head and said slide remain in their respective upstroke positions for return-traverse displacement to the pick-up region.

12. The device of claim 11, in which the horizontal reciprocating displacement is rectilinear, and in which said picking head is one of a plurality of picking heads in spaced array parallel to the direction of rectilinear displacement.

13. The device of claim 12, in which said plurality is at least three, in equally spaced array.

14. The device of claim 13, in which the spacing between adjacent heads of said array is variable, and space-control means to assure that variable spacings in said array are nevertheless equal.

15. The device of claim 14, in which said spacecontrol means is so coordinated with traverse actuation that a first equal spacing of said heads is established for said heads when in the pick-up region and a second but different equal spacing of said heads is established for said heads when in the discharge region.

16. The device of claim 11, in which control means including a computer is connected to said traverse-actuating means and to said selectively operable means for determining a succession of different pick-up locations in the pick-up region upon successive return-traverse displacements to the pick-up region.

17. The device of claim 16, in which said frame includes means for supporting a plug flat beneath said head when in the pick-up region wherein the plug flat has a multiple-cell row alignment parallel to the direction of traverse displacement, said computer being connected to determine pick-up operation upon one of the cells of said alignment in a first cycle of pick-up and discharge and to determine pick-up operation upon another of the cells of said alignment in a second cycle of pick-up and discharge.

18. The device of claim 17, in which said supporting means is a plug-flat conveyor having an indexable path of movement transverse to the direction of traverse displacement.

19. The device of claim 18, in which said conveyor includes index-drive means that is so connected for coordinating control by said computer that a plurality of cycles of pick-up and discharge involve plural plug-flat cells in a single row, prior to an indexing drive of said conveyor.

20. The device of claim 17, in which within the pick-up region said frame includes horizontal guide means parallel to the direction of traverse displacement and beneath the plane of plug-flat support, and a slide on said horizontal guide means, said slide having an airsupply duct terminating at an upwardly directed airdischarge port directly beneath said row alignment of the plug flat, said slide being coordinated for positioning along said guide means such that said port registers with the plug cell that is concurrently subjected to a picking cycle of said head.

21. The device of claim 20, in which an air supply connected to said duct includes computer-controlled means for single-pulse discharge of pressurized air via said port in coordination with head upstroke in the pick-up region.

22. The device of claim 11, in which control means including a computer is connected to said traverse-actuating means and to said selectively operable means for determining a succession of different discharge locations in the discharge region upon successive traverse displacements to the discharge region.

23. The device of claim 22, in which said frame includes means for supporting an array of transplanter cells beneath said head when in the discharge region, said array having a multiple-cell row alignment parallel to the direction of traverse displacement, said computer being connected to determine discharge operation at one of the cells of said alignment in a first cycle of pickup and discharge and to determine discharge operation at another of the cells of said alignment in a second cycle of pick-up and discharge.

24. The device of claim 23, in which said supporting means is a conveyor for the array of transplanter cells, said conveyor having an indexable path of movement transverse to the direction of traverse displacement.

25. The device of claim 24, in which said conveyor includes index-drive means that is so connected for coordinating control by said computer that a plurality of cycles of pick-up and discharge involve plural transplanter cells of a single row, prior to an indexing drive of said conveyor.

26. The device of claim 22, in which said conveyor has an elongate path of indexably advancing transplantercell support, wherein said pick-up and discharge regions are located at a station intermediate the longitudinal ends of said path, and in which a dibbling station is located on said path for dibbling operation upon soil-laden transplanter cells prior to transplanter-cell row advance to the station of said regions.

27. The device of claim 26, in which a cell-tagging station is located on said path at longitudinal offset from the dibbling station and from the station of said regions.

28. The device of claim 27, in which the cell-tagging station is located to perform upon transplanter cells after transplanting operations at the station of said regions.

29. A seedling pick-up and release device comprising an elongate body having elongate slide-guide means between upper and lower ends, a picking slide guided for reciprocating strokes between said ends, plural flexible prongs carried in spaced array by said picking slide and projecting downwardly below said picking slide, each of said prongs in unstressed condition extending on its own curvilinear course, prong-guide means forming part of said body and individually guiding the lower ends of said prongs in spaced array in substantially parallel relation to the elongate direction of said slide-guide means, and selectively operable actuating means for effecting stroke-reciprocating displacement of said picking slide; whereby, in the course of a downward stroke of said picking slide with respect to said body, the lower ends of said prongs will clear said prong-guide means and embark on the respective curvilinear courses of their unstressed condition, and further whereby, in the course of an upward stroke of said picking slide with respect to said body the lower ends of said prongs will be retracted in the substantially parallel array determined by said prong-guide means.

30. The device of claim 29, in which said body is a head slide vertically guided in frame-based guide means, second selectively operable means for reciprocated actuation of said head slide in said frame-based guide means, and means coordinating the sequence of operation of both of said selectively operable means such (1) that for seedling pick-up engagement, said picking slide is displaced for a downstroke only when said head slide has completed its downstroke, and (2) that for seedling lift, said head slide is displaced for an upstroke only while said picking slide is in its completed-downstroke position.

31. The device of claim 29, in which said selectively operable means comprises double-acting pneumatic means.

32. The device of claim 29, in which said slide has an actuating stem projecting externally of said body for manual stroke actuation.

33. The device of claim 32, in which a compression spring reacting between said body and said stem normally urges said slide and its prongs to the upper end of stroke travel.

34. The device of claim 33, in which said selectively operable means comprises finger-engageable means on said body and thumb-engageable means on said stem.

* * * * *

UNITED STATES PATENT AND TRADEMARK OFFICE
CERTIFICATE OF CORRECTION

PATENT NO. :     4,947,579

DATED      :     August 14, 1990

INVENTOR(S) :    RICHARD HARRISON, et al.

It is certified that error appears in the above-identified patent and that said Letters Patent is hereby corrected as shown below:

On face of Patent, first column, delete:

"[73] Assignee: Weirton Steel Corporation, Weirton, W. Va."

Signed and Sealed this

Twenty-seventh Day of November, 1990

Attest:

HARRY F. MANBECK, JR.

*Attesting Officer*     *Commissioner of Patents and Trademarks*

UNITED STATES PATENT AND TRADEMARK OFFICE
CERTIFICATE OF CORRECTION

PATENT NO. : 4,947,579

DATED : August 14, 1990

INVENTOR(S) : Richard Harrison, et al.

It is certified that error appears in the above-identified patent and that said Letters Patent is hereby corrected as shown below:

On the title page, second column, second line, "Attorney, Agent, or Firm -- Raymond N. Baker" should be corrected to read:

-- Attorney, Agent, or Firm -- Hopgood, Calimafde, Kalil, Blaustein & Judlowe --.

Signed and Sealed this

Nineteenth Day of May, 1992

Attest:

DOUGLAS B. COMER

*Attesting Officer*   *Acting Commissioner of Patents and Trademarks*